US007410204B2

(12) United States Patent
Koa

(10) Patent No.: US 7,410,204 B2
(45) Date of Patent: Aug. 12, 2008

(54) SPEAKER NOISE PATH SHIELD

(75) Inventor: Chi H Koa, West Bloomfield, MI (US)

(73) Assignee: Foamade Industries, Inc., Auburn Hills, MI (US)

(*) Notice: Subject to any disclaimer, the term of this patent is extended or adjusted under 35 U.S.C. 154(b) by 257 days.

(21) Appl. No.: 11/214,216

(22) Filed: Aug. 29, 2005

(65) Prior Publication Data

US 2006/0049664 A1 Mar. 9, 2006

Related U.S. Application Data

(60) Provisional application No. 60/607,096, filed on Sep. 3, 2004.

(51) Int. Cl.
*B60J 1/20* (2006.01)

(52) U.S. Cl. .................................................. 296/152

(58) Field of Classification Search ................. 296/152, 296/146.1, 146.5
See application file for complete search history.

(56) References Cited

U.S. PATENT DOCUMENTS 2,694,463 A * 11/1954 Robbins et al. ............. 181/155
4,247,586 A 1/1981 Rochlin
4,253,543 A 3/1981 Johansson
4,392,548 A 7/1983 Bailey
4,514,599 A * 4/1985 Yanagishima et al. ....... 381/152
4,679,651 A * 7/1987 Peeters ....................... 181/155
4,696,848 A 9/1987 Jones et al.
4,722,418 A * 2/1988 Peeters ....................... 181/155
4,769,188 A 9/1988 Graham et al.
4,848,829 A 7/1989 Kidd
4,865,791 A 9/1989 Ferror et al.
4,873,132 A 10/1989 Jones et al.
4,957,803 A 9/1990 Foley
5,004,066 A * 4/1991 Furukawa .................... 381/96
5,025,885 A * 6/1991 Froeschle ................... 181/156
5,090,762 A 2/1992 Krieger
5,111,905 A * 5/1992 Rodgers ..................... 181/152
5,189,706 A * 2/1993 Saeki ......................... 381/349
5,197,103 A * 3/1993 Hayakawa .................. 381/349
5,266,752 A * 11/1993 Cussans ..................... 181/155
5,322,722 A 6/1994 Rosenberg
5,409,779 A 4/1995 Puckett et al.
5,432,860 A * 7/1995 Kasajima et al. ............ 381/349
5,456,513 A 10/1995 Schmidt
5,482,343 A 1/1996 Bradac
5,595,415 A 1/1997 Beaulat
5,637,840 A * 6/1997 Kim ........................... 181/152
5,688,015 A 11/1997 Patterson et al.
5,825,900 A * 10/1998 Jeon ........................... 381/339
5,851,626 A 12/1998 McCorry et al.
5,899,522 A * 5/1999 DeRees et al. ........... 296/181.2
5,975,236 A * 11/1999 Yamamoto et al. .......... 181/156
6,007,890 A 12/1999 DeBlander (Continued)

*Primary Examiner*—H Gutman
(74) *Attorney, Agent, or Firm*—Harness, Dickey & Pierce, P.L.C.

(57) ABSTRACT

A door assembly comprises an interior panel and an exterior panel. A first semi-rigid barrier sheet is disposed between the interior and exterior panels. One or more features are formed in the first semi-rigid barrier sheet accommodating components housed between the interior and exterior panels. A second semi-rigid barrier sheet is offset from the first semi-rigid barrier sheet to diffuse sound waves directed toward an aperture formed through the first semi-rigid barrier sheet.

13 Claims, 5 Drawing Sheets

U.S. PATENT DOCUMENTS 6,045,921 A 4/2000 Restaino et al.
6,062,624 A 5/2000 Crabtree et al.
6,104,823 A * 8/2000 Tanaka ....................... 381/345
6,197,403 B1 3/2001 Brown et al.
6,302,472 B1 10/2001 Rahmstorf et al.
6,348,169 B1 2/2002 Stipes et al.
6,382,350 B1 5/2002 Jezewski et al.
6,412,852 B1 7/2002 Koa et al.
6,420,049 B1 7/2002 Restaino et al.
6,422,640 B2 7/2002 Whitehead et al.
6,428,081 B1 8/2002 Williams, Jr. et al.
6,493,919 B2 12/2002 Morrison et al.
6,572,976 B1 6/2003 Puckett et al.
6,619,724 B2 9/2003 Blömeling et al.
6,625,292 B2 * 9/2003 Proni ......................... 381/350
6,669,265 B2 12/2003 Tilton et al.
6,726,980 B2 4/2004 Staelgraeve et al.
6,744,902 B2 * 6/2004 Proni ......................... 381/386
6,767,049 B1 7/2004 Morrison et al.
6,890,018 B1 5/2005 Koa et al.
2001/0040970 A1 * 11/2001 Dage ........................... 381/86
2005/0210779 A1 * 9/2005 Koa et al. .................. 52/204.1
2006/0013431 A1 * 1/2006 Sugiura ...................... 381/392
2007/0029836 A1 * 2/2007 DeWolfe et al. ......... 296/146.7
2007/0046064 A1 * 3/2007 Winborn .................. 296/146.7

* cited by examiner

SPEAKER NOISE PATH SHIELD

CROSS-REFERENCE TO RELATED APPLICATIONS

This application takes priority from U.S. patent application Ser. No. 60/607,096 filed Sep. 3, 2004, 10/697,624 filed on Oct. 30, 2003, now U.S. Pat. No. 6,890,018, and Ser. No. 11/058,405 filed Feb. 15, 2005. The disclosures of the above applications are incorporated herein by reference.

FIELD OF THE INVENTION

The present invention relates to vehicle door assemblies, and more particularly to a molded Speaker Noise Path Shield (SNPS) for a vehicle door assembly.

BACKGROUND OF THE INVENTION

A vehicle door typically comprises an exterior panel that is formed of an outer, generally curved, exterior sheet of metal or plastic. The exterior panel conforms to the exterior surface of the body of the vehicle. An inner surface is formed on the panel by a metal sheet having edges peripherally secured to the outer sheet. The inner sheet is typically formed with a large central opening for access to a cavity provided between the sheets within the exterior door panel. A slot is formed at the upper edges of the two sheets for receiving a sheet of window glass. The glass sheet may be lowered into the cavity between the sheets for opening the window, or it may be raised upwardly for closing the window. Alternatively, the glass may be immovably fixed in the window opening with only its lower portion extending downwardly towards the cavity.

Various components are positioned within the cavity and may include a window mechanism for manually raising and lowering the window, a powered mechanism for raising and lowering the window by an electrical motor and drive system, and locking mechanisms for the door, door handle components, side view mirror attachment and adjustment components, and the like.

A trim panel covers the cavity of the exterior panel and is made of a sheet material that is of a size and shape to overlap and cover the interior surface of the exterior door panel. The trim panel may be formed of a thermoplastic material or a cloth type of material or a combination of both materials. Typically, the trim panel is molded or otherwise formed with a contoured or irregular surface that includes depressions, bosses, curved areas and the like. The peripheral edge of the trim panel is secured to the interior surface of the door panel by mechanical fasteners that can be disengaged so that the trim panel may be manually removed for providing access to the door components. Additionally, acoustic components such as stereo speakers can be mounted to the trim panel.

A barrier shield or water shield is provided and is formed of a relatively thin flexible, water impervious, plastic sheet which is cut to the size and shape necessary for covering the respective surfaces. Traditionally, the sheet adheres to one or both of the adjacent door panels or trim panel surfaces. The barrier shield prevents dirt, dust and/or water from leaking into the vehicle through the vehicle door assembly. However, conventional barrier shields include features that enable externally generated sound waves or road noise to pass into the vehicle interior. As a result, occupant comfort is diminished.

SUMMARY OF THE INVENTION

Accordingly, the present invention provides a speaker noise path shield (SNPS) that diffuses externally generated sound waves. The SNPS at least partially covers an aperture formed through a barrier sheet in a vehicle door assembly to diffuse sound waves traveling therethrough.

In one feature, the SNPS is formed of a like material as the barrier sheet. More specifically, the SNPS can be integrally formed with the barrier sheet and subsequently cut therefrom for assembly in the vehicle door assembly. The general form and/or features of the SNPS can be concurrently formed with forming of the barrier sheet prior to cutting the integrally formed SNPS from the barrier sheet. Alternatively, the SNPS and features of the SNPS can be formed subsequent to removing a pre-formed SNPS from the barrier sheet.

In another feature, the SNPS includes resonance frequency diffusion (RFD) features that enhance the diffusion capability of the SNPS.

In still another feature, the SNPS includes a layer of sound diffusion material that enhances the diffusion capability of the SNPS.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2*a* is a detailed cross-sectional view of the barrier shield;

DETAILED DESCRIPTION OF THE PREFERRED EMBODIMENTS

The following description of the preferred embodiments is merely exemplary in nature and is in no way intended to limit the invention, its application, or uses.

Figure 1:
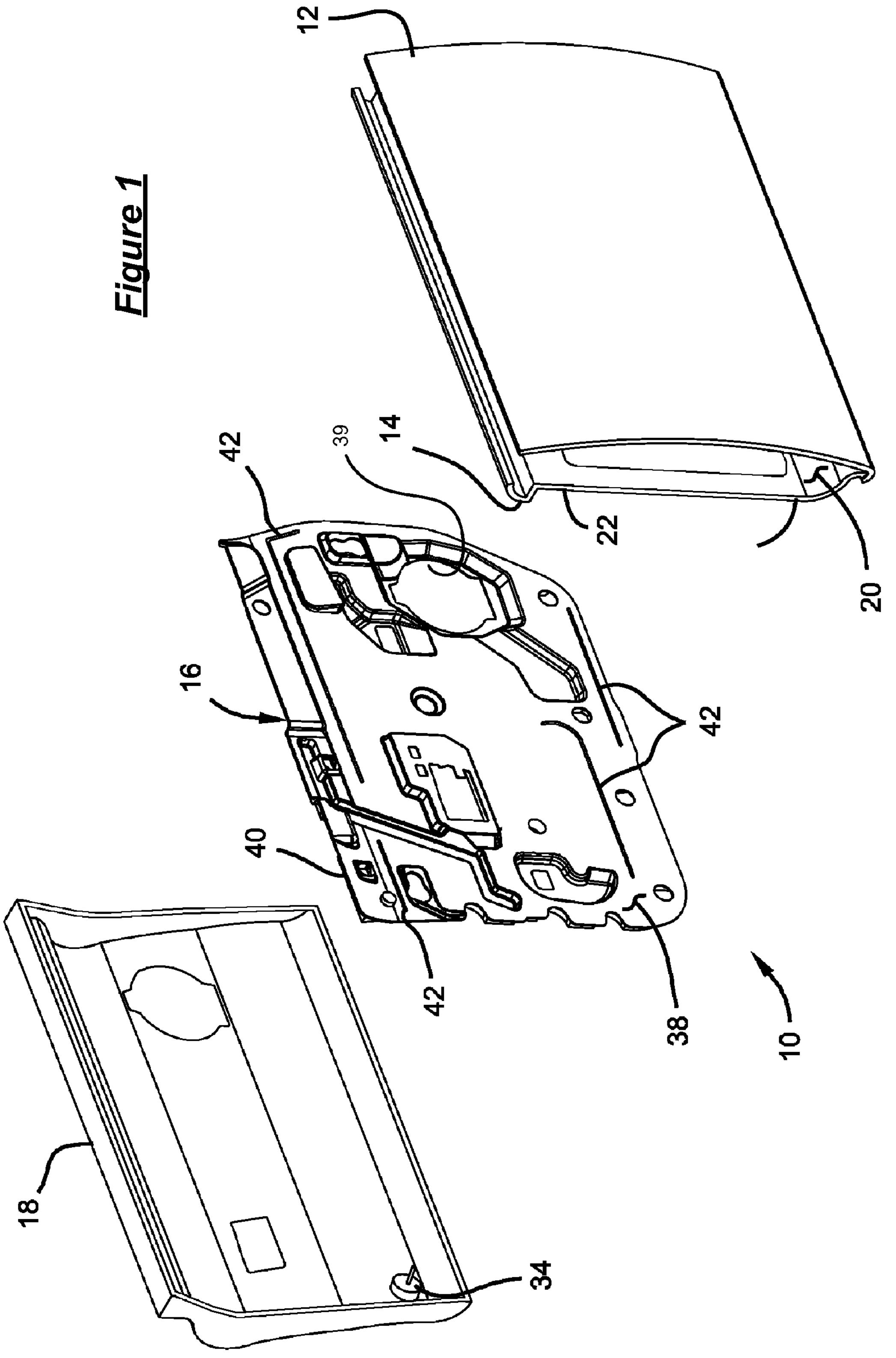
FIG. 1 is an exploded view of an exemplary vehicle door assembly according to the present invention.
Figure 2:
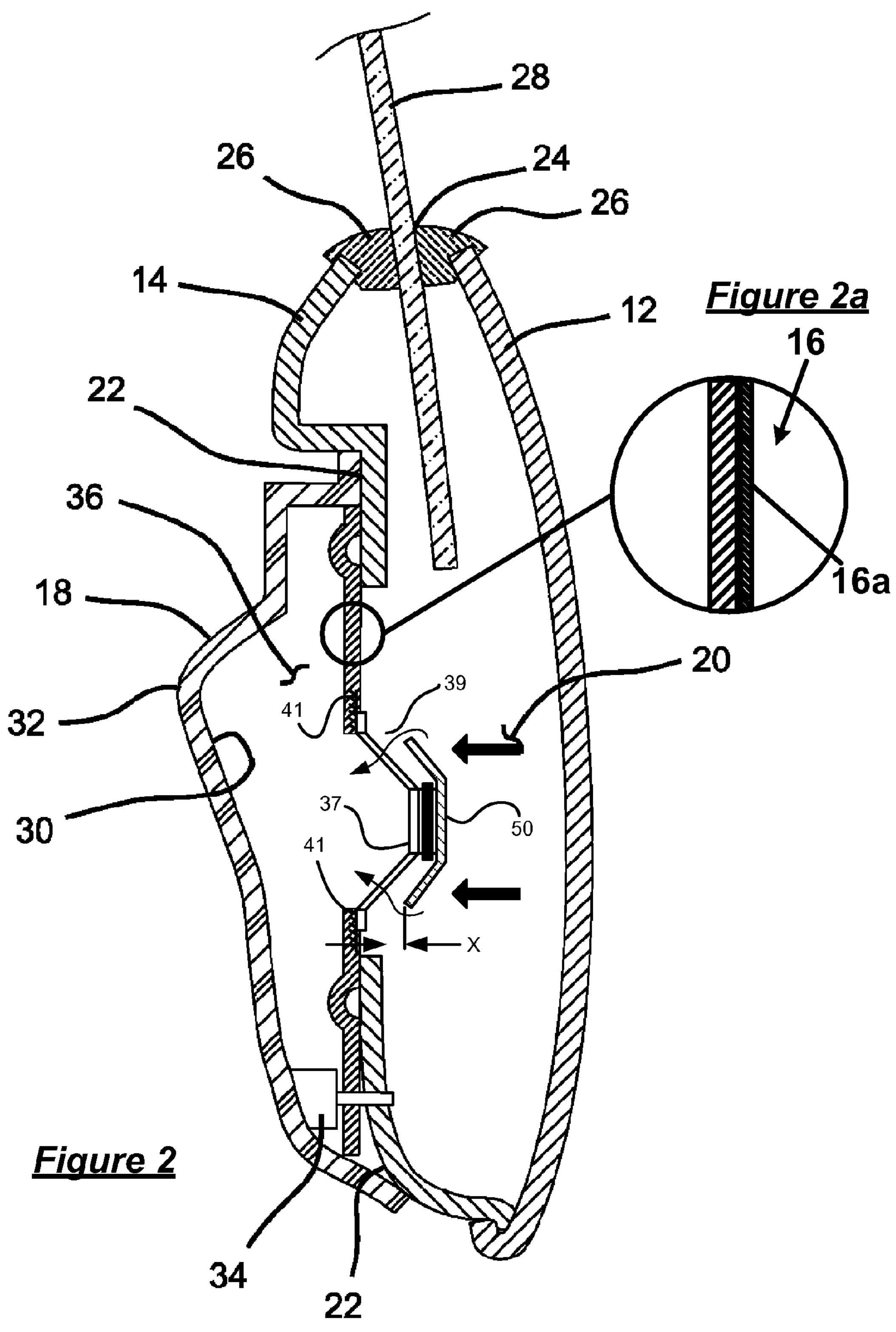
FIG. 2 is a cross-sectional view of the exemplary vehicle door assembly including a speaker that implements the SNPS of the present invention.

Referring now to FIGS. 1 and 2, a vehicle door assembly 10 is shown. The door assembly 10 includes an exterior panel 12, an inner panel 14, a barrier shield 16 and an interior trim panel 18. The exterior panel 12 forms the exterior surface of the door assembly 10. The inner panel 14 is secured to the exterior panel 12 by various means including crimping and welding. The exterior panel 12 and the inner panel 14 constitute an exterior panel assembly. A cavity 20 is defined by the exterior and inner panels 12,14. The interior trim panel 18 is mounted on a surface 22 of the inner panel 14. The interior trim panel 18 is made of either a molded, or thermoformed, plastic sheet or a composite plastic and cloth material or a plastic or wood or metal sheet covered with cloth material.

An upper edge 24 of the cavity 20 is gapped to form a slot whose side edges are covered with resilient edge beads 26. A glass sheet 28 fits within the slot 24 and slides up and down by a mechanical or electromechanical mechanism (not shown) disposed within the cavity 20. Drain or weep holes (not shown) are included at the lower edge of the exterior panel 12 to enable drainage of water and/or dirt that seeps into the cavity 20 around the glass sheet 28 and through the slot 24.

The trim panel 18 includes an outer surface 30 that faces towards the cavity 20 and an inner surface 32 that faces towards a vehicle interior. The interior trim panel 18 carries various components that are used to operate the mechanisms associated with the door assembly 10. For example, door lock control switches and window control switches, for raising and lowering the window, and door opening handles may be mounted on the interior trim panel 18. The interior trim panel 18 typically includes irregular surfaces such as bends, depressions and openings for mounting the door handle, the control switches, radio speakers and the like.

Mechanical fasteners 34 are included that secure the interior trim panel 18 to the inner panel 14. The mechanical fasteners 34 may be in the form of so called "Christmas Tree" fasteners which consist of a stud portion having a head fitted within a molded boss formed on the outer surface of the trim panel 18 and springy leg extensions that fit into cooperating fastener holes in the inner panel 14. The irregularities and bends and depressions of the interior trim panel 18 define an interior cavity or space 36 for packaging mechanical controls or door mounted devices, such as radio speakers, locks or window switches and the like. More specifically, a speaker 37 is supported within the cavity 36 and extends through the barrier shield 16 into the cavity 20, as explained in further detail below.

The barrier shield 16 is disposed between the trim panel 18 and the inner panel 14. The barrier shield 16 is formed of a semi-rigid plastic sheet, preferably made of a water impervious thermoplastic, heat resistant material. Because the barrier shield 16 is semi-rigid it retains a degree of flexibility and the barrier shield 16 functions as a moisture barrier as it is water impervious. The particular barrier shield material may be selected by those skilled in the art from various commercially available types of material suitable for this purpose. More specifically, the material includes any thermally formable material such as a thermoplastic polymeric material. Preferably, the material includes a thermoplastic olefin (TPO) including a cross-linked polypropylene and polyethylene blend. The water shield 16 also includes a linear low density polyethylene film and a silicon-based coating 16*a*, as illustrated in FIG. 2*a*.

The barrier shield 16 includes an outer surface 38 that faces the cavity 20 and an inner surface 40 that faces the cavity 36. A substantially continuous, pressure sensitive adhesive stripe or bead 42 is applied to the outer surface 38 of the water shield 16. Additionally, individual spots or strips of adhesive 42 are applied at various points on the water shield 16. The adhesive 42 may be covered with a release paper (not shown) to protect against adhering to other surfaces until the water shield 16 is ready to be applied against the inner panel 14. The release paper may be removed to expose the adhesive spots and adhesive strips 42 for adhering to the water shield 16 to the inner panel 14. It is further anticipated, however, that the water shield 16 can be attached to the trim panel 18 or the exterior panel 12.

Figure 3:
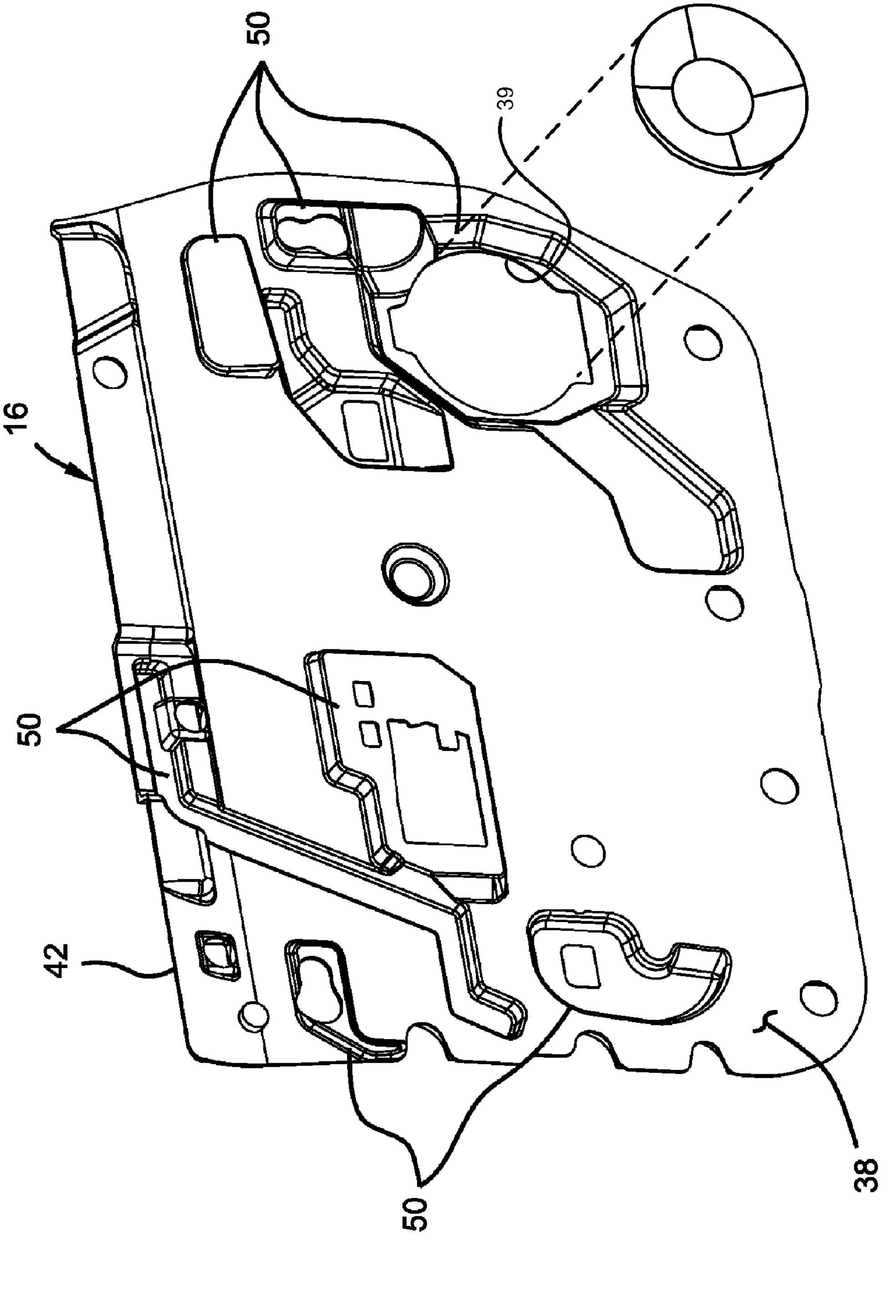
FIG. 3 is an exploded view of an exemplary barrier shield including a separable speaker noise path shield (SNPS) according to the present invention.

Referring now to FIGS. 2 and 3, pockets, depressions and other features 50 are formed in the barrier shield 16 to accommodate the various panel contours and devices installed in the cavity 36 and to facilitate mounting on bosses (not shown). More specifically, the barrier shield 16 includes a speaker aperture 39. The speaker 37 is supported on anchor points 41 or the inner panel 14 within the cavity 36 and extends into the cavity 20 through the speaker aperture 39. The speaker 37 faces the interior trim panel 18, whereby sound generated by the speaker 37 is directed into the interior of the vehicle through a speaker cover (not shown) of the interior trim panel 18. A speaker noise path shield (SNPS) 51 is mounted on the side of the speaker 37 that extends toward the cavity 20.

The SNPS 51 is preferably formed from the excess material generated when the speaker aperture 39 is cut into the barrier sheet 16. It is anticipated, however, that the SNPS 51 can be formed as an individual component, independent from the barrier sheet 16. In this manner, the SNPS 51 can be formed of a different material than the barrier sheet such as, but not limited to, a fibrous material. The SNPS 51 can be formed to its desired shape and to include desired features with the barrier sheet 16 and subsequently separated therefrom. It is further anticipated that the SNPS 51 can be subsequently formed to a desired shape and to include desired features subsequent to being separated as a generally flat sheet from the barrier sheet 16. The SNPS 51 is preferably conical in shape to substantially encompass the speaker 37. It is appreciated that other shapes are anticipated including, but not limited to, a flat sheet.

Figure 4:
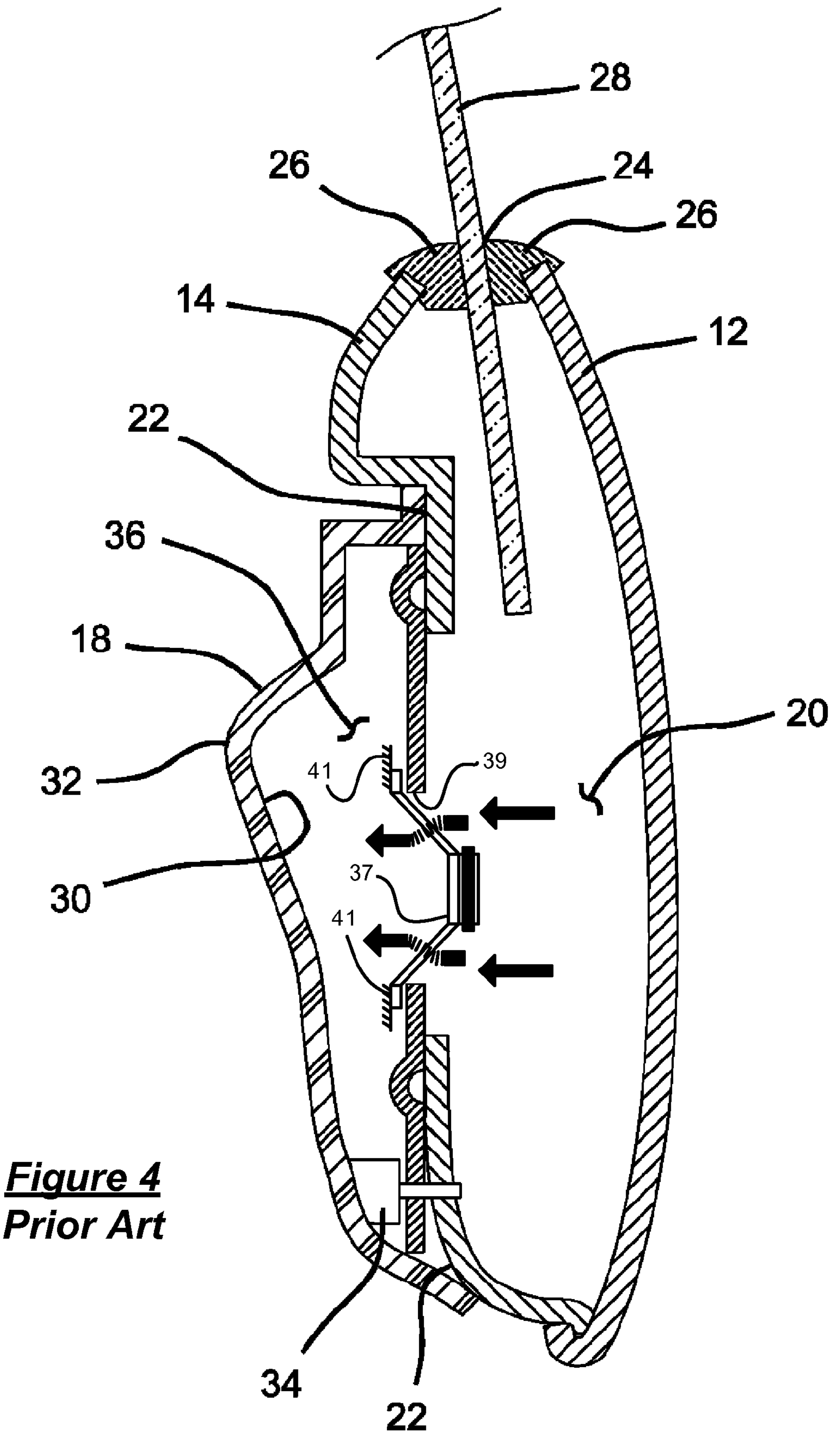
FIG. 4 is a cross-sectional view of an exemplary, traditional vehicle door including a speaker that does not implement the SNPS of the present invention.

Referring now to FIG. 2, SNPS 51 is offset a distance (X) from the speaker aperture 39 to diffuse and absorb sound waves generated external to the vehicle. It is preferred that X is minimized to enhance the sound diffusion/absorption effectiveness of the SNPS 51. More specifically, the design of the present invention addresses the problem depicted in FIG. 4, where externally generated sound waves can pass through the exterior panel 12, the cavity 20 and through the speaker 37 and speaker aperture 39 into the vehicle interior. Such sound or "road noise" detracts from occupant comfort. The SNPS 51 (FIG. 2) provides a barrier to diffuse the externally generated sound waves, reducing the amount of road noise experienced by an occupant. In this manner, occupant comfort is improved. It is anticipated that the SNPS 51 is mounted directly on the speaker 37 or some other structure, whereby the SNPS 51 substantially covers the speaker aperture 39 to diffuse/absorb sound waves that would potentially travel therethrough.

Figure 5:
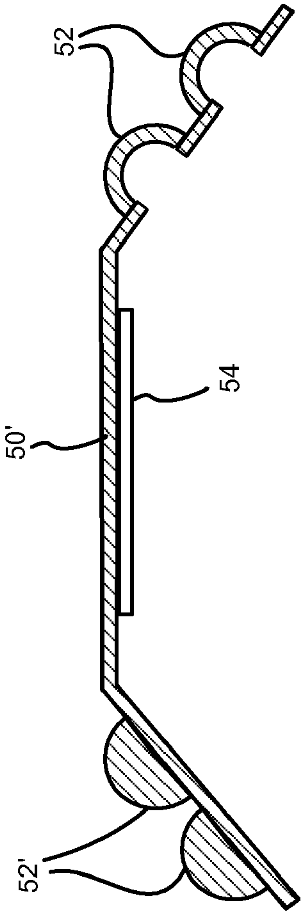
FIG. 5 is a cross-section view of an alternative SNPS including resonance frequency diffusion (RFD) features according to the present invention.
Figure 6:
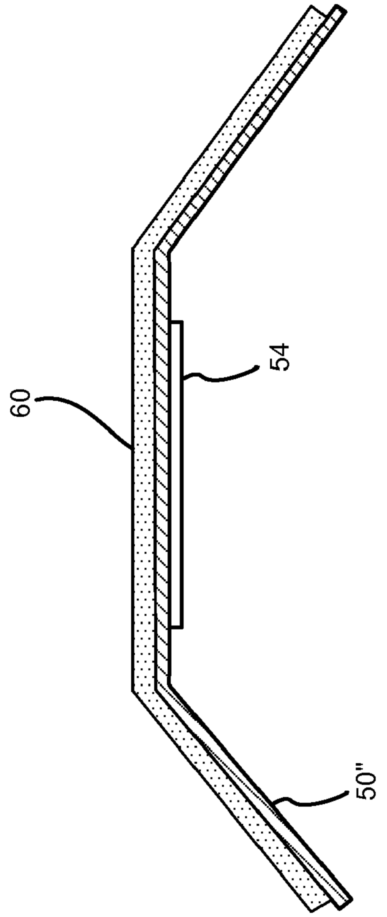
FIG. 6 is a cross-section of another alternative SNPS including sound attenuation material attached thereto according to the present invention.

Referring now to FIGS. 5 and 6, exemplary SNPS's will be described in detail. FIG. 5 illustrates an SNPS 51' including resonance frequency diffusion (RFD) features 52 and 52' formed therein as generally described herein below. The RFD features 52 are also disclosed in further detail in U.S. patent application Ser. No. 10/697,624, filed Oct. 30, 2003, (now U.S. Pat. No. 6,890,018) and Ser. No. 11/058,405 filed Feb. 15, 2005, the disclosures of which are expressly incorporated herein by reference. The RFD features 52,52' enhance the rigidity of the SNPS 51 and diffuse sound to inhibit vibration of the SNPS 51 and passage of sound waves therethrough. More particularly, externally generated sound waves impact the water shield 16. A portion of the sound waves are diffused and reflected by the irregular surfaces of the RFD features 52,52'. Although the RFD features 52,52' are shown as semi-spherical dimples, the shape of the RFD features 52 is not limited and other forms include, but are not limited to, oval, rectangular and pyramid. The SNPS 51 can be attached to a speaker or other anchor point using an adhesive layer 54.

Referring now to FIG. 6, a layer of sound attenuating material 60 is optionally attached to the SNPS 51. The sound attenuating material 60 may vary in size, shape and composition and preferably includes a thick pad or layer of fibrous material. The pad is bonded to the SNPS 51 to further enhance the sound diffusion capabilities of the SNPS 51. The fibrous padding material is preferably formed of intertwined, intermingled or bonded natural or synthetic fibers. The padding material is preferably non-woven. It is anticipated that the SNPS 51 can include both the RFD features 52,52' and the sound attenuating material 60.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door assembly, comprising:

an interior panel and an exterior panel;

a first semi-rigid barrier sheet disposed between said interior and exterior panels;

one or more features formed in said first semi-rigid barrier sheet accommodating components housed between said interior and exterior panels;

and a second semi-rigid barrier sheet offset from said first semi-rigid barrier sheet to diffuse sound waves directed toward an aperture formed through said first semi-rigid barrier sheet, wherein at least one of said first and second semi-rigid barrier sheet is formed of a water resistant material.

2. A door assembly, comprising:

an interior panel and an exterior panel;

a first semi-rigid barrier sheet disposed between said interior and exterior panels;

one or more features formed in said first semi-rigid barrier sheet accommodating components housed between said interior and exterior panels; and a second semi-rigid barrier sheet offset from said first semi-rigid barrier sheet to diffuse sound waves directed toward an aperture formed through said first semi-rigid barrier sheet, wherein at least one of said first and second semi-rigid barrier sheet is formed of a thermally formable material.

3. The door assembly of claim 2 wherein said thermally formable material is selected from a group consisting of a thermoplastic polymeric material and a thermoplastic olefin (TPO).

4. The door assembly of claim 3 wherein said TPO comprises a cross-linked polypropylene and polyethylene blend.

5. A door assembly, comprising:

an interior panel and an exterior panel;

a first semi-rigid barrier sheet disposed between said interior and exterior panels;

one or more features formed in said first semi-rigid barrier sheet accommodating components housed between said interior and exterior panels; and a second semi-rigid barrier sheet offset from said first semi-rigid barrier sheet to diffuse sound waves directed toward an aperture formed through said first semi-rigid barrier sheet, and a linear low density polyethylene film and a silicon-based coating applied to a surface of at least one of said first and second semi-rigid barrier sheet.

6. A door assembly, comprising:

an interior panel and an exterior panel;

a first semi-rigid barrier sheet disposed between said interior and exterior panels;

one or more features formed in said first semi-rigid barrier sheet accommodating components housed between said interior and exterior panels; and a second semi-rigid barrier sheet offset from said first semi-rigid barrier sheet to diffuse sound waves directed toward an aperture formed through said first semi-rigid barrier sheet, and layer of sound attenuation material that absorbs non-diffused sound waves that pass through at least one of said first and second semi-rigid barrier sheet.

7. A door assembly, comprising:

an interior panel and an exterior panel;

a first semi-rigid barrier sheet disposed between said interior and exterior panels;

one or more features formed in said first semi-rigid barrier sheet accommodating components housed between said interior and exterior panels; and a second semi-rigid barrier sheet offset from said first semi-rigid barrier sheet to diffuse sound waves directed toward an aperture formed through said first semi-rigid barrier sheet, and a pressure sensitive adhesive material that adhesively engages at least one of said first and second semi-rigid barrier sheet.

8. A door assembly, comprising:

an interior panel and an exterior panel;

a first semi-rigid barrier sheet disposed between said interior and exterior panels;

one or more features formed in said first semi-rigid barrier sheet accommodating components housed between said interior and exterior panels; and a second semi-rigid barrier sheet offset from said first semi-rigid barrier sheet to diffuse sound waves directed toward an aperture formed through said first semi-rigid barrier sheet, wherein one or both of said first and second semi-rigid barrier sheets comprises a plurality of resonance frequency diffusion (RED) reliefs formed in said semi-rigid barrier sheet that diffuse sound waves directed toward said semi-rigid barrier sheet.

9. The door assembly of claim 8 wherein said RED reliefs are semi-spherical in shape.

10. A door assembly, comprising:

an interior panel and an exterior panel;

a first semi-rigid barrier sheet disposed between said interior and exterior panels;

one or more features formed in said first semi-rigid barrier sheet accommodating components housed between said interior and exterior panels; and a second semi-rigid barrier sheet offset from said first semi-rigid barrier sheet to diffuse sound waves directed toward an aperture formed through said first semi-rigid barrier sheet, wherein at least one of said first and second semi-rigid barrier sheets comprises a relief pattern comprising a plurality of raised regions relative to a plurality of lower regions, said relief pattern arranged to diffuse sound waves.

11. The door assembly of claim 10 wherein said raised regions comprise protrusions of said semi-rigid moisture barrier material outward from a surface of the second semi-rigid barrier sheet.

12. The door assembly of claim 10 wherein said raised regions comprise material deposited on a surface of said second semi-rigid barrier sheet.

13. The door assembly of claim 12 wherein said deposited material is the same as said semi-rigid barrier sheet.

* * * * *